Oct. 19, 1965 R. A. QUINN ETAL 3,213,338

SEMICONDUCTIVE DIODE OF SINGLE-CRYSTAL RUTILE AND METHOD OF MAKING SAME

Filed April 11, 1962

4 Sheets-Sheet 1

INVENTORS.
ROSS A. QUINN
LEWIS E. HOLLANDER, JR.
BY George C. Sullivan
Agent

INVENTORS.
ROSS A. QUINN
LEWIS E. HOLLANDER, JR.
BY George C. Sullivan
Agent

Oct. 19, 1965 R. A. QUINN ETAL 3,213,338

SEMICONDUCTIVE DIODE OF SINGLE-CRYSTAL RUTILE AND METHOD OF MAKING SAME

Filed April 11, 1962 4 Sheets-Sheet 3

INVENTORS.
ROSS A. QUINN
LEWIS E. HOLLANDER, JR.
BY George C. Sullivan
Agent

Oct. 19, 1965 R. A. QUINN ETAL 3,213,338
SEMICONDUCTIVE DIODE OF SINGLE-CRYSTAL RUTILE
AND METHOD OF MAKING SAME
Filed April 11, 1962 4 Sheets-Sheet 4

INVENTORS.
ROSS A. QUINN
LEWIS E. HOLLANDER, JR.
BY George C. Sullivan
Agent

United States Patent Office 3,213,338

Patented Oct. 19, 1965

3,213,338

SEMICONDUCTIVE DIODE OF SINGLE-CRYSTAL RUTILE AND METHOD OF MAKING SAME

Ross A. Quinn, Palo Alto, and Lewis E. Hollander, Jr., Los Altos Hills, Calif., assignors to Lockheed Aircraft Corporation, Burbank, Calif.

Filed Apr. 11, 1962, Ser. No. 186,757
9 Claims. (Cl. 317—235)

This invention relates to making semiconductive diodes and a process for making the same and more particularly relates to a matrix of such semiconductive diodes.

In the field of digital computers and the like it is frequently necessary to provide a matrix of low power diodes for performing various logical functions. Heretofore it has been necessary when constructing a diode matrix to connect a plurality of single discrete diode elements into a circuit by soldering or the like. Such procedure has the disadvantages that the diodes are often adversely affected by the heat from the soldering process and that the resultant matrix occupies an excessive volume.

The use of titanium dioxide for making diodes and rectifiers has been known in the prior art, e.g., U.S. Patent No. 2,692,212. However, to the best of our knowledge other prior devices or processes have not been concerned with titanium dioxide in the single crystal rutile form.

Therefore, it is an object of our invention to provide a process for making semiconductive diodes of single-crystal rutile.

Another object is to provide a process by which a matrix of semiconductive diodes can be constructed.

Still another object of our invention is to provide a process for making a matrix of semiconductive diodes in which the characteristics of each individual diode are the same.

Yet another object is to provide a matrix of semiconductive diodes which occupies a very small volume.

These and other objects will be more apparent after referring to the following specification and attached drawings in which.

Figure 1:
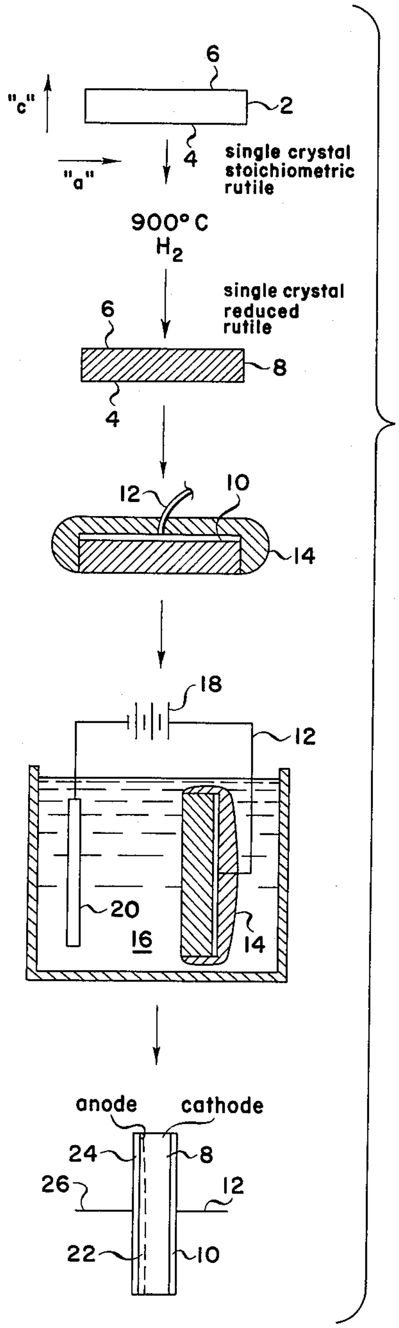
FIGURE 1 is a diagrammatic illustration of the process of our invention for constructing a single semiconductive diode.
Figure 2:
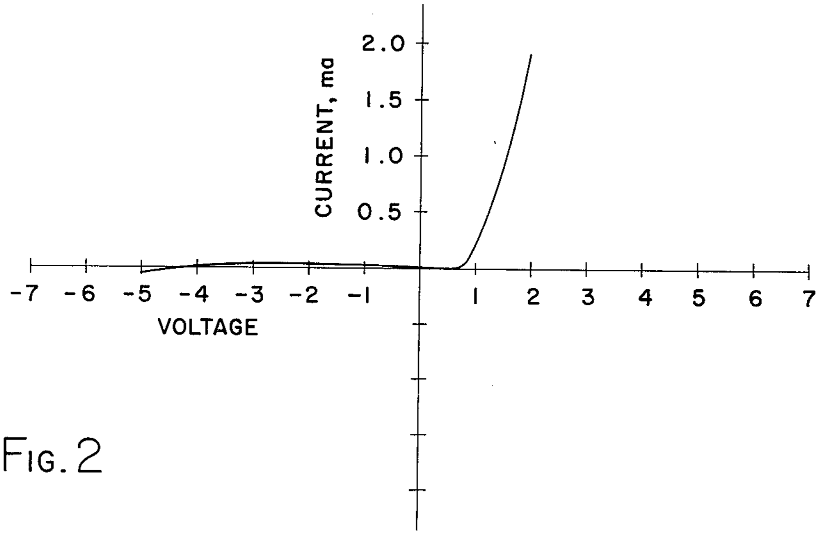
FIGURE 2 is a graph of voltage vs. current for a diode constructed in acordance with our invention.

Referring more particularly to the drawings, and in particular to FIGURE 1, reference numeral 2 indicates a body of single-crystal stoichiometric rutile formed from a boule of single-crystal material by cutting along planes normal to the "*c*" crystallographic axis to create substantially parallel surfaces 4 and 6. The surface 4 is polished by conventional techniques until it possesses a substantial optical flatness, a procedure hereinafter referred to as optically polishing the surface 4. The formed rutile body 2 is then reduced to a nonstoichiometric form so that it possesses a specific resistivity of about 1 ohm centimeter. There are many well known techniques for reducing rutile, for example, by heating the rutile in a hydrogen atmosphere to about 900° C. for about one hour. On the surface 6 of reduced rutile body 8 we then place an electrode 10 which may be of any suitable conductive material, for example, indium solder. We then attach an electrical conductor 12 to the electrode 10 after which we cover the entire body 8, exclusive of surface 4, with a suitable insulative coating 14, such as silicon potting or the like. Next we place the rutile body 8 into a conventional anodizing bath 16 and connect the electrical conductor 12 to the positive terminal of a battery 18. A suitable electrode 20 of carbon or the like is also placed in bath 16 and connected to the negative terminal of the battery 18. We prefer to carry out the anodizing process at about 115 volts for approximately five minutes to form a layer 22 on reduced rutile body 8 which layer possesses a specific resistivity in the range of about $10^3$ ohm-centimeters to about $10^7$ ohm-centimeters. Finally we remove the rutile body 8 from the bath 16, remove the insulative material 14, clean the surface of the anodized layer 22 and apply an electrode 24 thereto. Thereafter we connect an electrical conductor 26 to the electrode 24 to obtain a semiconductor diode in which the layer 22 of relatively high resistivity rutile forms the anode and the body 8 of reduced rutile having a relatively low resistivity forms the cathode. The diode so produced has a voltage-current characteristic shown in FIGURE 2. Our reference hereinabove to the step of anodizing the surface 4 of rutile body 8 is intended to be merely exemplary of an oxidizing process. Any oridizing process which will partially restore the oxygen vacancies in a crystal structure of the reduced rutile may be used so long as a layer 22 with semiconductor properties and a resistivity in the proper range is obtained.

Figure 3:
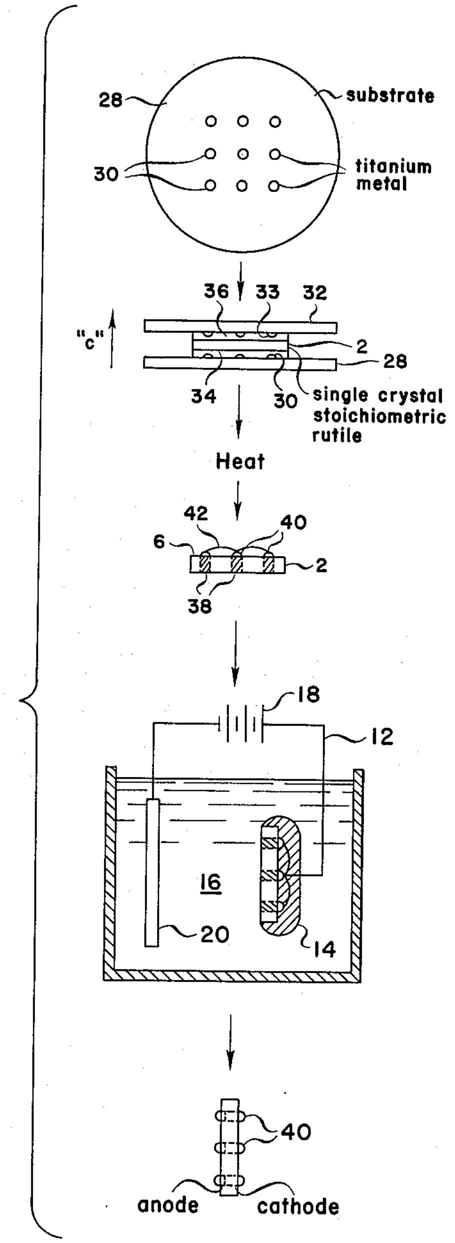
FIGURE 3 is a diagrammatic illustration of the preferred manner for carrying out the process of our invention in order to obtain a matrix of semiconductive diodes.
Figure 4:
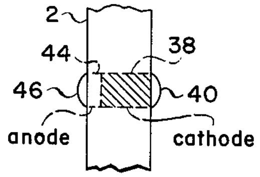
FIGURE 4 is an enlarged view of a portion of FIGURE 3.

A process for reducing rutile has been disclosed in copending commonly assigned application for United States Letters Patent, Serial No. 56,140, filed on September 15, 1960, now Patent No. 3,138,504, and such process lends itself admirably to our present invention. We have discovered that single-crystal rutile possesses anisotropic characteristics with regard to the mobility of oxygen vacancies therein. Thus oxygen vacancies have considerable mobility in a direction along the "*c*" crystallographic axis and have negligible mobility in a direction along the "*a*" crystallographic axis. We utilize that phenomenon to provide one or more very small diodes in a body of single-crystal rutile in the process shown with more particularity in FIGURE 3. Upon any suitable refractory substrate 28 such as high density alumina ceramic or the like we place a plurality of titanium spots 30 by any well known process, for example, vacuum deposition. A substrate 32 is prepared which is similar to the substrate 28 and has titanium spots 33 thereon arranged in a pattern identical with the spots 30 on substrate 28. Upon the titanium spots 30 on substrate 28 is placed a layer of salt 34 as disclosed in the above-cited patent application and upon salt layer 34 is placed the single-crystal stoichiometric rutile body 2 having surfaces 4 and 6 perpendicular to the "*c*" crystallographic axis. We next place a salt layer 36 on top of rutile body 2 and place the substrate 32 on salt layer 36 with titanium spots 33 aligned opposite the titanium spots on the substrate 32. In accordance with the process of the above-cited patent application we then apply heat which causes the salt in layers 34 and 36 to fuse so as to dissolve the titanium in spots 30 and 33 and enable the titanium to act as a reducing agent. Due to the anisotropic characteristics of rutile, the reduction will occur substantially only in the direction of the "c" crystallographic axis. By the foregoing procedure a plurality of columns 38 of reduced rutile are formed in the single-crystal stoichiometric rutile body 2. It is not absolutely necessary to use titanium spots on both sides of the body 2 because we have found that discrete columns of reduced rutile can be formed by placing the titanium metal spots on one side only of the body 2. However, we prefer to place titanium spots on both sides of the rutile body 2 to obtain columns of reduced rutile having a smaller cross-sectional area. We next place a suitable conductive electrode 40 at the end of each rutile column 38 on surface 6 of the body 2 and inter-connect each electrode 40 with an electrical conductor 42. Lead 12 is connected to the conductor 42 and insulative material 14 is then placed upon the prepared body 2 so as to cover the body 2 with the exception of the surface 4. Rutile body 2 is now placed in a suitable anodizing bath 16 with an electrode 20. The lead 12 is connected to the positive terminal of the battery 18, electrode 20 is connected to negative terminal of battery 18, and the anodizing step is carried out as heretofore described. Because stoichiometric rutile has a specific resistivity of approximately $10^{12}$ ohm-centimeters, the anodizing action will be restricted to the ends of conductive reduced rutile columns 38 which are exposed to anodizing bath 16. Thus, as FIGURE 4 depicts, only the small areas of the ends of columns 38 will be oxidized to form a layer 44 of rutile having a specific resistivity in the range of $10^3$ ohm-centimeters to $10^7$ ohm-centimeters. Upon completion of the anodizing step rutile body 2 is removed from the bath and insulative compound 14 is removed from the body 2. A suitable conductive electrode 46 is then placed upon the anodized layer 44 of each column 38 and a plurality of diodes are formed wherein the electrode 46 represents the anode and the electrode 40 represents the cathode.

Figure 5:
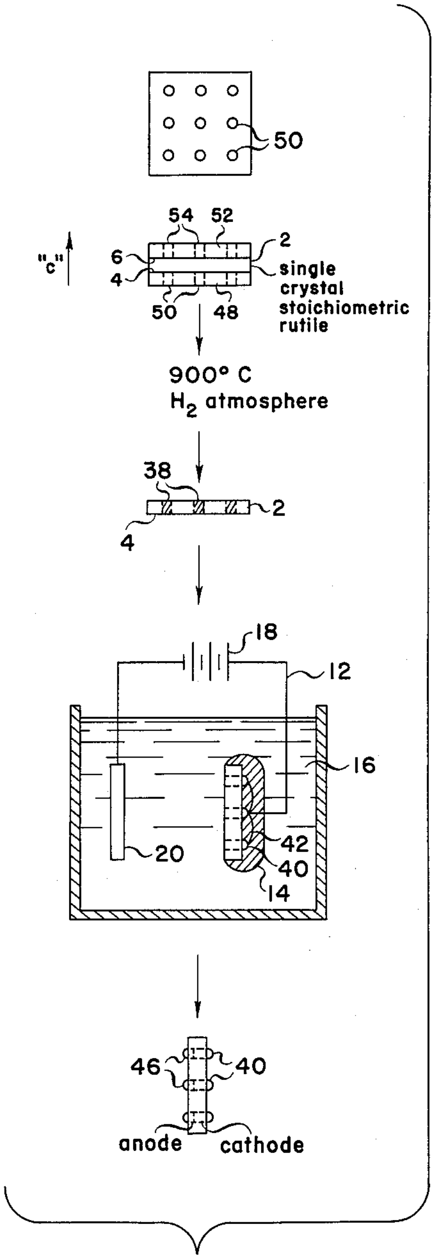
FIGURE 5 is a diagrammatic illustration of another embodiment of the process of our invention.

By use of the process depicted in FIGURE 5 we are also able to produce a diode matrix similar to that described next above. A body 2 of single-crystal stoichiometric rutile has an optically polished surface 4 substantially normal to the "c" crystallographic axis formed in a manner previously described. A mask 48 is placed on the surface 4 and has a plurality of apertures 50 through which small areas of the surface 4 are exposed. The surface 6 of rutile body 2 is similarly prepared with a mask 52 having a plurality of apertures 54 therethrough which apertures are arranged in a pattern identical with the pattern in which the apertures 50 are arranged. The masks 48 and 52 may be constructed in a suitable manner such as by: first, placing spots of a suitable salt at the locations on rutile body 2 where reduced columns are desired; second distributing frit upon the surface; and third, heating the body and the frit to form masks 48 and 52 of material having a glass-like glaze which is resistant to high temperature. The salt spots prevent appropriate portions of the surface of the rutile body 2 from being wetted by the fused frit. The masked rutile body 2 is then placed in a reducing atmosphere such as a hydrogen atmosphere and is heated until columns 38 of reduced rutile are formed through the rutile body 2. The volume of rutile body 2 which is reduced will be restricted to columns 38 due to the anisotropic characteristics of the mobility of the oxygen vacancies in single-crystal rutile. The rutile body 2 is then prepared for anodizing in a manner described above by the attachment of electrodes 40, conductor 42, lead 12 and insulative material 14. Anodization in a bath 16 with a battery 18 and an electrode 20 is then carried out as described above and, after cleaning the rutile body 2 and placing electrodes 46 on each anodized layer 44, a plurality of diodes of the type shown in FIGURE 4 are produced. It should be obvious that the process can be carried out by providing a mask 52 which has no apertures 54 therein and permitting the reduction of the rutile to take place only through the apertures 50 in mask 48. However, we prefer to have opposing apertures in each of the masks 48 and 52 so that the cross-sectional area of the reduced columns 38 is substantially constant through the length of the columns 38.

The masks 48 and 52 may also be prepared by drilling suitably located holes 50 and 54 in a disc of ceramic material such as alumina. One of the discs is placed upon surface 4 of rutile body 2 and the other disc is placed on surface 6 with holes 50 and 54 aligned opposite one another. Suitable clamping means may be used to hold the ceramic discs tightly in place. Then by following the procedure disclosed in the aforesaid patent application columns 38 of reduced rutile can be formed. This technique has the advantage over the method using frit masks in that the cleaning of the surfaces of rutile body 2 is simplified.

Figure 6:
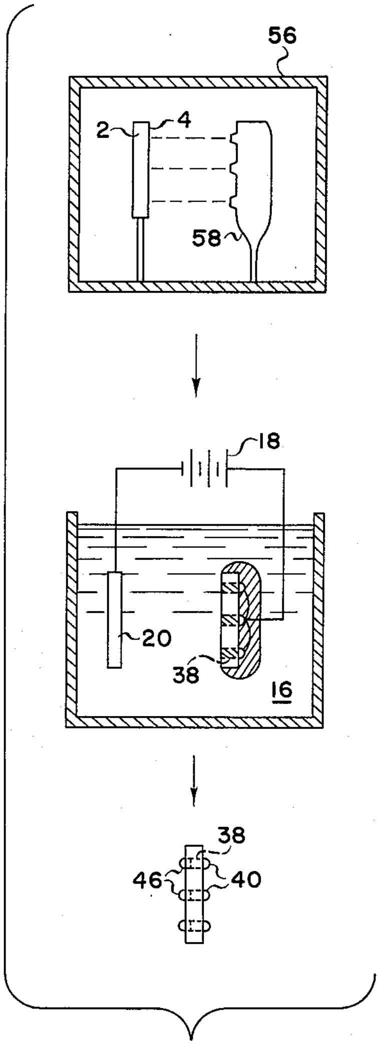
FIGURE 6 is a diagrammatic illustration of still another embodiment of the process of our invention.

Columns 38 of reduced rutile may also be formed through the rutile body 2 by the process shown in FIGURE 6 in which the rutile body 2 is suitably mounted in an enclosed chamber 56 which also has installed therein a conventional source 58 of electron beams. After the rutile body has been oriented and prepared as described above and mounted within chamber 56, chamber 56 is evacuated. The surface 4 of rutile body 2 is then bombarded with a plurality of streams of electrons from the source 58 which streams preferably have a very small cross-sectional area. Due to the anisotropic mobility of the oxygen vacancies in single-crystal rutile, small columns 38 of reduced rutile having a resistivity of about 1 ohm-centimeter will be formed in a direction parallel with the "c" crystallographic axis. Suitable electrodes 40 are now attached to one end of each of the columns 38 and anodizing is carried out as before to form the rectifying junction. Thereafter the article is cleaned and electrodes 46 are placed on the portion 44 of the reduced column whose specific resistivity has been increased to the range of about $10^3$ ohm-centimeters to about $10^7$ ohm-centimeters, thus forming a plurality of semiconductive diodes.

In each of the embodiments described herein the step for oxidizing the end of rutile columns 38 has been carried out by anodization. Any other suitable oxidizing procedure may be used such as heating in air or any suitable oxygen-containing atmosphere. Best results are obtained by anodization, however, because of the fact that the field gradients developed in this process tend to drive the oxygen into the crystal lattice.

Figure 7:
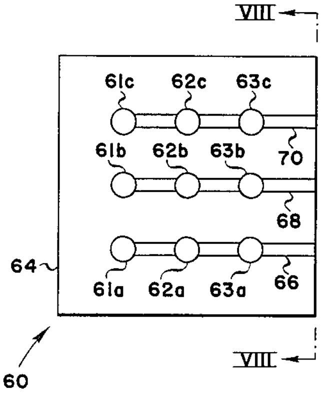
FIGURE 7 is a diagrammatic representation of a matrix of semiconductive diodes which result from the practice of the instant invention.
Figure 8:
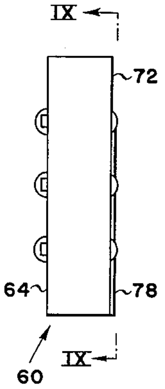
FIGURE 8 is a diagrammatic view of the matrix of semiconductive diodes on the line VIII—VIII of FIGURE 7 looking in the direction of the arrows.
Figure 9:
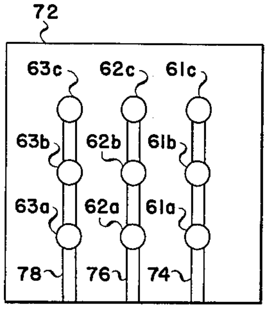
FIGURE 9 is a diagrammatic view of the matrix of semiconductive diodes on the line IV—IV of FIGURE 8 looking in the direction of the arrows.
Figure 10:
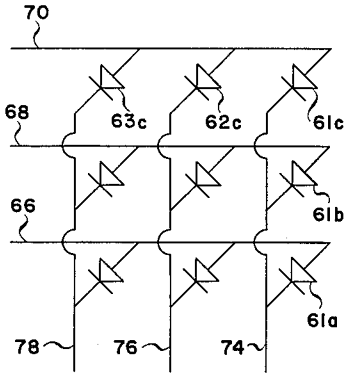
FIGURE 10 is a circuit diagram of the matrix of semiconductive diodes.

Many uses for the devices described above will occur to those skilled in the art. For example, in FIGURE 7 a diode matrix 60 is shown having individual diodes *61a*, *62a*, *63a*, *61b*, *62b*, *63b*, *61c*, *62c* and *63c* therein. On one side 64 of the matrix 60 one terminal of diodes *61a*, *62a* and *63a* are interconnected by means of a conductor 66, one terminal of diodes *61b*, *62b* and *63b* are interconnected by a conductor 68 and one terminal of diodes *61c*, *62c* and *63c* are interconnected by a conductor 70. The conductors 66, 68 and 70 may be in any suitable conductive material such as copper foil or the like, the use of which is well known by those skilled in the printed circuit art. As seen in FIGURE 8, on the opposing surface 72 of matrix 60 the opposite terminals of the diodes may be interconnected. Thus, referring now to FIGURE 9, the opposite terminals of diodes *61a*, *61b* and *61c* are interconnected by a conductor 74, the diodes *62a*, *62b* and *62c* are interconnected by a conductor 76, and diodes *63a*, *63b* and *63c* are interconnected by a conductor 78. Conductors 74, 76 and 78 are constructed of the same material as conductor 66. From the circuit diagram of the device shown in FIGURE 10, those skilled in the art will appreciate the many uses to which the device may be put in computer logic circuits and the like.

While several embodiments of our invention have been shown and described it will be apparent that other adaptations and modifications may be made without departing from the scope of the following claims.

We claim as our invention:

1. A process for making a semiconductor diode comprising the steps of forming a body of single-crystal rutile having two susbstantially flat parallel surfaces which are substantially normal to the "c" crystallographic axis of the rutile, optically polishing at least one of said surfaces, reducing a column of the rutile parallel to the "c" crystallographic axis and extending between said parallel surfaces by placing a pair of refractory substrates having a plurality of titanium spots thereon over said parallel surfaces with said spots in alignment along the "c" crystallographic axis until the column possesses a low electrical resistivity, anodizing a polished surface of the body to form a thin layer of rutile thereon having a specific resistivity in the range of about $10^3$ ohm-centimeters to about $10^7$ ohm-centimeters, and placing an electrode film on each of said surfaces.

2. A process for making a semiconductor diode comprising the steps of forming a body of single-crystal rutile having two substantially flat parallel surfaces which are substantially normal to the "c" crystallographic axis of the rutile, optically polishing at least one of said surfaces, placing a salt layer consisting of 22 mole percent NaCl, 53 mole percent KCl and 25 mole percent KI, on one surface of the body, placing titanium metal spot on said salt layer, heating the prepared body until a column of reduced rutile parallel to the "c" crystallographic axis and extending between said parallel surfaces is formed which column has a low electrical resistivity, cleaning the salt from said surface, oxidizing only said surface to form a thin layer of rutile thereon having a specific resistivity in the range of about $10^3$ ohm-centimeters to about $10^7$ ohm-centimeters and placing an electrode film on each of said surfaces.

3. A process for making a semiconductor diode comprising the steps of forming a body of single-crystal rutile having two substantially flat parallel surfaces which are substantially normal to the "c" crystallographic axis of the rutile, optically polishing at least one of said surfaces, placing the body in an evacuated atmosphere, bombarding one of said surfaces with a stream of electrons until a column of reduced rutile parallel to the "c" crystallographic axis and extending between said parallel surfaces is formed which column has a low electrical resistivity, anodizing only one of said surfaces to form a thin layer of rutile thereon having a specific resistivity in the range of about $10^3$ ohm-centimeters $10^7$ ohm-centimeters, and placing an electrode film on each of said surfaces.

4. A process for making a matrix of semiconductor diodes comprising the steps of forming a body of single-crystal rutile having two substantially flat parallel surfaces which are substantially normal to the "c" crystallographic axis of the rutile, optically polishing at least one of said surfaces, forming a plurality of columns of reduced rutile between said surfaces by placing a pair of refractory substrates having a plurality of titanium spots thereon over said parallel surfaces with said spots in alignment along the "c" crystallographic axis, oxidizing only the polished surface of said body to form a thin layer on each column of rutile having a resistivity in the range of about $10^3$ ohm-centimeters to about $10^7$ ohm-centimeters, and placing an electrode on each end of each column.

5. A process for making a matrix of semiconductor diodes comprising the steps of forming a body of single-crystal rutile having two substantially flat parallel surfaces which are substantially normal to the "c" crystallographic axis of the rutile, optically polishing at least one of said surfaces, placing a salt layer consisting of 22 mole percent NaCl, 53 mole percent KCl and 25 mole percent KI on one surface of the body, placing a plurality of titanium metal pellets on said salt layer, heating the prepared body until a plurality of columns of reduced rutile parallel to the "c" crystallographic axis and extending between said parallel surfaces are formed which columns have a low electrical resistivity, cleaning the salt from said surface, electrically contacting the columns on the surface opposite said cleaned surface, anodizing the cleaned surface to form a thin layer of rutile at one end of said columns having a specific resistivity in the range of about $10^3$ ohm-centimeters to about $10^7$ ohm-centimeters, placing an electrode on each said rutile layer, and placing an electrode on the opposite end of each reduced column.

6. A process for making a matrix of semiconductor diodes comprising the steps of forming a body of stoichiometric single-crystal rutile having two substantially flat parallel surfaces which are substantially normal to the "c" crystallographic axis of the rutile, optically polishing at least one of said surfaces, masking one of said surfaces whereby only a plurality of relatively small areas of the surface are exposed, covering the surface opposite the masked surface, heating the body prepared as aforesaid in a reducing atmosphere until a plurality of columns of reduced rutile between said surfaces are formed, oxidizing only the polished surface of said body to form a thin layer on each column of rutile having a resistivity in the range of about $10^3$ ohm-centimeters to about $10^7$ ohm-centimeters, and placing an electrode on each end of each column.

7. A process for making a matrix of semiconductor diodes comprising the steps of forming a body of stoichiometric single-crystal rutile having two substantially flat parallel surfaces which are substantially normal to the "c" crystallographic axis of the rutile, optically polishing at least one of said surfaces, placing the body in an evacuated atmosphere, bombarding one of said surfaces with a plurality of streams of electrons until a plurality of columns of reduced rutile between said surfaces are formed, oxidizing only the polished surface of said body to form a thin layer on each column of rutile having a resistivity in the range of about $10^3$ ohm-centimeters to about $10^7$ ohm-centimeters, and placing an electrode on each end of each column.

8. A matrix of semiconductor diodes comprising a body of single-crystal substantially stoichiometric rutile, said body having first and second substantially parallel faces which are substantially normal to the "c" crystallographic axis of said body, a plurality of columns of reduced rutile substantially extending from said first surface to said second surface, said columns being substantially parallel with the "c" crystallographic axis of said body and within the crystal structure of said body, and a layer of oxidized rutile on one of each of said columns and within the crystal structure of said body, said layers having specific resistivities in the range of about $10^3$ ohm-centimeters to about $10^7$ ohm-centimeters.

9. The invention of claim 8 which is further defined as having an electrode connected to each end of said columns.

References Cited by the Examiner

UNITED STATES PATENTS

| | | | |
|---|---|---|---|
| 2,633,543 | 3/53 | Howatt | 317—237 XR |
| 2,851,405 | 9/58 | Dymon et al. | 317—237 XR |
| 2,852,448 | 9/58 | Dymon et al. | 317—237 XR |
| 3,037,180 | 5/62 | Linz | 317—237 |

DAVID J. GALVIN, *Primary Examiner.*